United States Patent
Fields

[15] 3,649,171
[45] Mar. 14, 1972

[54] PREPARATION OF ALKALI METAL TETRATITANATE

[72] Inventor: David P. Fields, Wilmington, Del.

[73] Assignee: E. I. du Pont de Nemours and Company, Wilmington, Del.

[22] Filed: Feb. 18, 1970

[21] Appl. No.: 12,431

[52] U.S. Cl. ................................................23/51, 106/299
[51] Int. Cl. ..............................................C01g 23/00
[58] Field of Search ......................................23/51

[56] References Cited

UNITED STATES PATENTS 3,328,117  6/1967  Emslie et al. ..............................23/51

FOREIGN PATENTS OR APPLICATIONS 1,135,948  12/1968  Great Britain..............................23/51
862,593  3/1961  Great Britain..............................23/51

*Primary Examiner*—Herbert T. Carter
*Attorney*—Frank R. Ortolani

[57] ABSTRACT

Alkali metal titanates are produced substantially exclusively in the tetratitanate form in a process in which mineral rutile is the titanium dioxide source by particular control of reaction parameters including particle size of reaction mixture components to influence the titanate form obtained.

5 Claims, No Drawings

PREPARATION OF ALKALI METAL TETRATITANATE

BACKGROUND AND RELATED ART

Alkali metal titanates are known and have been used as pigments, insulating materials and opacifying agents. One process for the preparation of alkali metal titanates is disclosed in U.S. Pat. No. 3,328,117 in which products containing a ratio of $TiO_2/M_2O$ (M being alkali metal) of from 4:1 to 9:1 are obtained. Rutile is one of the $TiO_2$ raw materials shown in that patent for its process.

Among alkali metal titanates, specific crystal species have different effects on pigmenting properties, and particularly on the important properties of powder brightness and paper opacity. For example, a relatively higher brightness and opacity are achievable with the tetratitanate crystal form compared to the di- or the hexa- titanate forms.

SUMMARY OF THE PRESENT INVENTION

In the present invention, alkali metal titanate is produced substantially exclusively in the tetratitanate form. This is accomplished by calcining a mixture of mineral rutile, alkali metal carbonate and alkali metal halide, all in selected size gradations and in certain ratios, at a temperature of about 850° to 1,020° C. Since consistently good properties are associated with the tetratitanate form, and reduced cost results from using a mineral reactant in place of a manufactured one, it is apparent that considerable advantage is had with this discovery.

The present process is, in general, carried out as is the process of U.S. Pat. No. 3,328,117; i.e., by calcining mineral rutile and an $M_2O$ source, M being an alkali metal of atomic number 11 through 19 inclusive, in the presence of a reaction medium comprising an alkali metal halide, but with limitations necessary to produce the selected product successfully when using rutile. These conditions include particle sizes of the components and the like. This is illustrated in detail in the operation of the process of this invention in the following example.

EXAMPLE

Mineral rutile, previously magnetically separated and dry ground, having the following chemical analysis (weight percent): 97.5 percent $TiO_2$, 0.20 percent $SiO_2$, 0.25 percent $Al_2O_3$ 0.15 percent Fe, 0.10 percent Cr, 0.40 percent V and 0.50 percent Zr, is blended with potassium carbonate and potassium chloride in the following amounts:

150 grams of ground mineral rutile
81 grams of $K_2CO_3$, (a mole ratio of $TiO_2/k_2O$ of 3.2)
75 grams KCl, (a weight ratio of $TiO_2/KCl$ of 2).

The rutile is of particle size that 95 percent passes through a 325-mesh screen (U.S. Standard Sieve Series in this and all other instances in this application). The potassium carbonate obtained as −20 mesh, is milled to reduce it until about 85 percent is −325 mesh size, the full analysis being:

| | |
|---|---|
| +40 mesh | 0.5% by weight |
| −40+100 mesh | 6.0% |
| −100 mesh +325 mesh | 8.0% |
| −325 mesh | 85.5% |

The potassium chloride is used in −30 mesh particle size as received commercially. These components are blended by passing them through a micropulverizer. The blended material is sprayed with water (6 percent by weight of the blend) and is fed to a Carver press using a 1⅛-inch die at 5,000 p.s.i.g. and briquetted to 25 gram pellets.

The pellets are placed in a cold muffle furnace, and the furnace is heated up over a period of 2 hours to a temperature of 960° C. This temperature is maintained for 1 hour, and the hot pellets are then removed and water quenched. A sample of the dry kiln discharge before quenching is analyzed by X-ray diffraction, and found to be almost exclusively potassium tetratitanate.

The calcined briquettes are soaked overnight in water, and then broken up by tamping lightly with a rod. The crumbled solids are allowed to settle, the supernatant liquid is decanted, and the solids disintigrated until all will pass an 8-mesh screen. The solids are reslurried in water to a volume of 2 liters, filtered, and washed with 4 liters of hot tap water to remove potassium chloride and uncombined alkali from the titanate product. After washing, the solids are reslurried to a volume of 3 liters with tap water and passed through a Charlotte colloid mill, equipped with a 10-mm. wet clone, for 10 minutes. The coarse fraction is recycled to the colloid mill.

The product recovered from the colloid mill is adjusted to a pH of 5±0.2 using 2 normal $H_2SO_4$. This corresponds to a neutralization of the potassium tetratitanate product to an adjusted stoichiometric ratio of $TiO_2/K_2O$ of 10–12 to 1. The acidified and leached slurry is then filtered, but not washed. The filter cake is dried at 120° C. for 16 hours and ground in a micropulverizer. The resulting leached product is, crystallographically, the tetratitanate.

Other pigments according to the invention are made with the same general procedure but varying the method of blending used. Still other runs are made beyond the scope of this discovery. The products obtained are analyzed for crystal form as kiln discharge and are further tested for powder brightness (TAPPI Test T646-M54) and paper opacity (for making hand sheets, TAPPI Test T205-M58; for opacity, TAPPI Test T425-M60). The properties are shown in the following table wherein pigment prepared according to the process of this invention are products 2, 3 and 4. (The calcination time and temperature for products 1, 5 and 6 are 1 hour at 980° C., while for all others they are 1 hour at 940° C.).

TABLE

| Product | Blend particle sizes and particle size Ranges | $TiO_2$ source | Ratio molar ($TiO_2$–$K_2O$) | Method of blending | Crystal form (kiln dschg.) | Powder brightness | Paper opacity |
|---|---|---|---|---|---|---|---|
| 1 | Commercially available $TiO_2$, $K_2CO_3$ and KCl. | Pigmentary anatase $TiO_2$. | 3.5 | Twin-shell mixer | $K_2Ti_4O_9$ | 97.5 | +27 |
| 2 | Same as 4 | Mineral rutile | 3.2 | Micropulverizer | $K_2Ti_4O_9$ | 95.5 | +25 |
| 3 | do | do | 3.2 | Ball milling | $K_2Ti_4O_9$ | 95.5 | +25 |
| 4 | Mineral rutile 95%–325 mesh ($K_2CO_3$–85%–325 mesh (KCl–commercially available. | do | 3.2 | Twin shell mixer | $K_2Ti_4O_9$ | 95.5 | +25 |
| 5 | Mineral rutile 95%–325 mesh commercially available $K_2CO_3$ and KCl. | do | 3.5 | do | $K_2Ti_6O_{13}$, $K_2Ti_4O_9$ ($Ti_6 > Ti_4$) | 92.5 | +15 |
| 6 | do | do | 3.5 | Micropulverizer | $K_2Ti_4O_9$, $K_2Ti_6O_{13}$ ($Ti_4 > Ti_6$). | 94.5 | +20 |
| 7 | do | do | 3.2 | Twin shell mixer | $K_2Ti_4O_9$, $K_2Ti_6O_{13}$, $Ti_4 > Ti_6$. | 94.0 | +19 |

These data and information show that products with good powder brightness and opacity in paper can be produced with an inexpensive starting material specifically mineral rutile. This is readily observed in comparing products 2, 3 and 4 with 1.

Data such as are in the Table show mineral rutile can be used as a raw material to produce alkali metal titanate almost exclusively in the highly desirable tetratitanate form. From such data it has been concluded that the range of conditions for this process include that the mineral rutile be sized so that more than 80 percent should pass a 325-mesh screen; preferably, 95 percent should pass a 325-mesh screen. The alkali metal halide all should pass a 30-mesh screen, a size in which it is available commercially. The alkali metal oxide source should have at least 50 percent pass a 325-mesh screen. This particle size may be achieved either by pregrinding the alkali metal oxide source, before blending the ingredients or by grinding the ingredient blend.

In forming the blend sufficient of the rutile is used to provide from 2.8 to 3.45 mols $TiO_2$ per mol of oxygen-bearing alkali metal compound (calculated as $K_2O$). Further, 1 to 6 parts by weight of the mineral rutile are used per part of the alkali metal halide. Suitably, calcination is carried out at 850° to 1,020° C. for from about 15 minutes to about 16 hours, the lower temperatures being related to the longer times. The preferred operating condition is calcination at a temperature of 900° to 960° C. for from 1 to 4 hours. A preferred method of operation uses a rotary kiln operating at a temperature (at the hot end) of 950° C., the rate of feed and discharge being adjusted to obtain the desired of growth of the acicular titanate product, as is well known. For grinding and blending of the ingredients, ball milling and micropulverizing (hammer milling) have been found to give satisfactory results. These methods of size reduction and mixing provide sufficient energy to give a properly mixed blend. Less vigorous methods such as twin-shell mixing, have proved to be effective if the ingredients are preground to a fine particle size.

Although for purposes of illustration of this invention, potassium chloride has been used as the alkali metal salt and potassium carbonate as the alkali metal oxide source, it will be recognized by those conversant with the art of producing alkali metal titanates, that the corresponding sodium salts and oxygen containing compounds may replace the potassium salts and compounds wholly or in part. Other changes will occur to those skilled in the art.

What is claimed is:

1. A process for the production of alkali metal titanates having the crystallographic structure of tetratitanate, which process comprises calcining a blend of (1) mineral rutile, (2) one or more oxygen-bearing alkali metal compounds which will yield $M_2O$ upon calcination, where M is sodium, potassium or mixtures thereof, (3) and at least one alkali metal halide selected from the group consisting of sodium chloride and potassium chloride, said mineral rutile being of particle size such that at least 80 percent by weight thereof passes through a 325-mesh screen; and said oxygen-bearing alkali metal compound being of particle size such that at least 50 percent by weight thereof passes through a 325-mesh screen; said mineral rutile, oxygen-bearing alkali metal compound, and alkali metal halide being thoroughly blended prior to calcination; said blend containing mineral rutile in an amount to provide 2.8 to 3.45 mols (as $TiO_2$) per mol of oxygen-bearing alkali metal compound (calculated as $M_2O$) and there being 1 to 6 parts by weight of mineral rutile (as $TiO_2$) per part of alkali metal halide; said calcination being carried out at temperature of from 850° to 1,020° C., for a period of at least 15 minutes.

2. The process of claim 1 in which at least 95 percent of said mineral rutile and 85 percent of said oxygen-bearing alkali metal compound are of a size to pass a 325-mesh screen.

3. A process according to claim 1 in which the alkali metal in said oxygen-bearing alkali metal compounds is potassium.

4. A process according to claim 1 in which the alkali metal in said oxygen-bearing alkali metal compounds is a mixture of sodium and potassium.

5. The process of claim 3 in which at least 95 percent of said mineral rutile and 85 percent of said oxygen-bearing alkali metal compound are of a size to pass a 325-mesh screen.